UNITED STATES PATENT OFFICE.

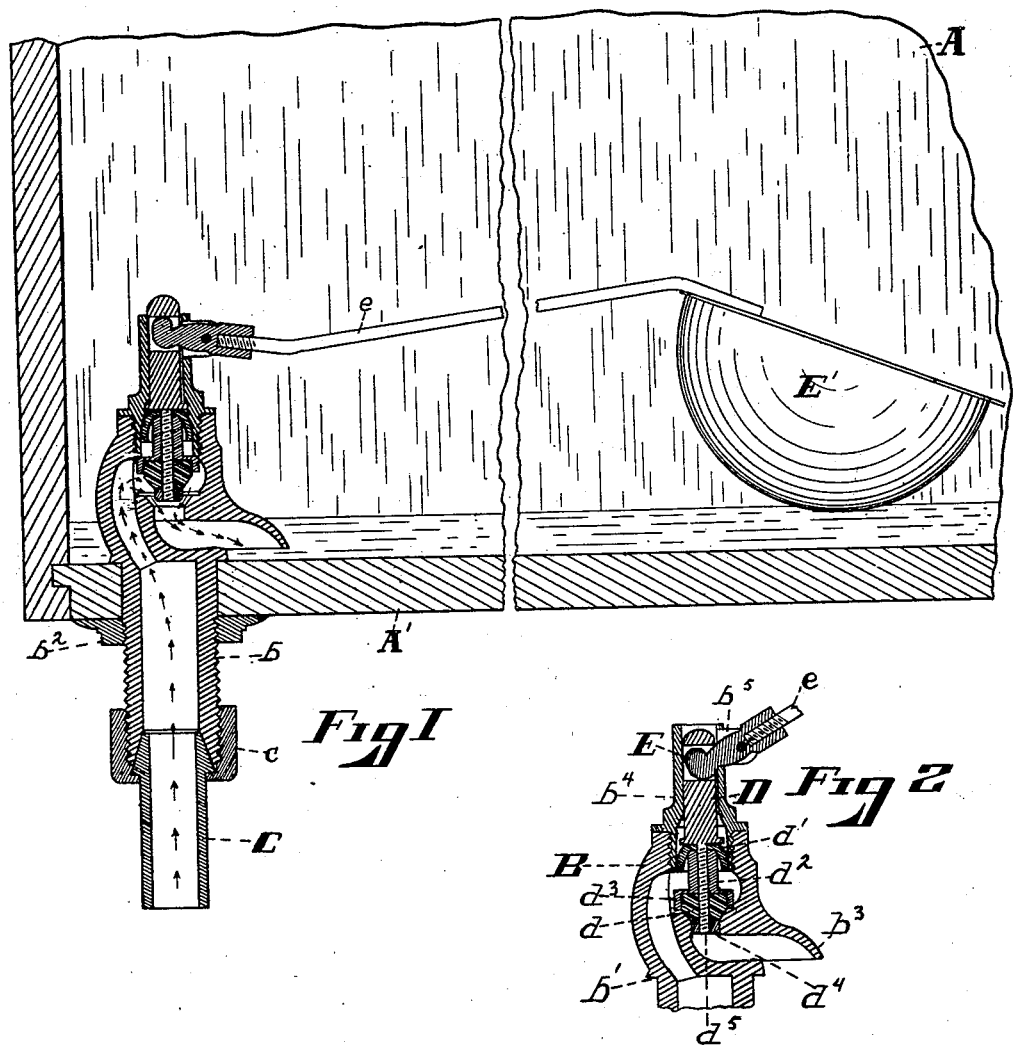

JOHN PORTEOUS, OF CINCINNATI, OHIO.

BALL-COCK VALVE.

SPECIFICATION forming part of Letters Patent No. 669,146, dated March 5, 1901.

Application filed May 16, 1898. Serial No. 680,795. (No model.)

*To all whom it may concern:*

Be it known that I, JOHN PORTEOUS, a citizen of the United States, and a resident of Cincinnati, in the county of Hamilton and State of Ohio, have invented certain new and useful Improvements in Ball-Cock Valves, of which the following is a specification.

The object of my invention is to provide an easy-moving and reliable ball-cock valve especially designed for use in flushing-tanks for water-closets which is inexpensive in construction, not liable to get out of order, noiseless in use, and not liable to leakage when the valve is closed upon its seat to cut off the supply of water to the tank.

With this object in view my invention consists in the peculiar construction and arrangement of parts illustrated in the accompanying drawings, in connection with which the invention will be first fully described and then particularly referred to and pointed out in the claims.

Referring to the drawings, Figure 1 is a vertical longitudinal section of a flushing-tank provided with my valve, the valve being shown in axial section and in the open position. Fig. 2 is a detail view taken through the valve in the same plane as Fig. 1, but with the valve in the closed position.

Referring to the parts, which are indicated by similar reference-letters wherever they occur throughout both views, A represents the flushing-tank, the bottom A' of which is perforated near one end to receive the shank $b$ of the valve-case B, which has flanges $b'$ at the bottom of the case, and the lower end of the shank screw-threaded to engage the flanged nut $b^2$, which clamps and firmly holds the valve-case in place on the bottom A' of the tank. The lower end of the shank $b$ is funnel-shaped to receive the cone end of the supply-pipe C, which is tightened into the lower end of the shank $b$ by a box or tubular nut $c$, which is centrally perforated, leaving a plain flange around the perforation to engage the shoulders under the cone-shaped end of the supply-pipe C. The parts above described, excepting the case B of the valve, are well known and need not therefore be more specifically described.

The valve-case B, with its shank $b$, is cast in a single piece, having the entry and discharge port divided by a transverse partition perforated centrally below the upper opening and turned or dressed cone-shaped to receive the cone-shaped elastic valve $d$, which controls the supply of water to the tank, the discharge-spout $b^3$ being on a level with the upper edge of the flange which rests upon the bottom A' of the tank, so that the water is noiselessly discharged against the bottom of the tank. The upper end of the case is screw-tapped to receive the upper extension $b^4$ of the valve-case, the enlarged perforation in the lower end of which is dressed true to seat the elastic valve $d'$, which is preferably made of a leather disk and when in position, as seen in the drawings, assumes a cup shape, leaving an opening between it and the stem or shaft $d^2$ of the inverted-cup-shaped part $d^3$, which incases the elastic valve $d$, which is held in place by a nut $d^4$ on the lower screw-threaded end of a shank $d^5$ of an actuating valve-stem D, which slides freely in the reduced perforation of the upper extension $b^4$. The enlarged part of the stem D has an annular flange around its lower edge to bear against a shoulder dividing the larger and smaller perforations in the upper extension to limit the upper movement of the valves $d$ and $d'$. The end of the neck or stem $d^2$ is rounded on its upper edge and screw-threaded interiorly to tighten the elastic valve $d'$ against the shoulder of the enlarged stem D.

It will be seen that a space is left between the cup-shaped part of the valve $d'$ and the shank $d^2$ to receive the water under pressure and keep the cup-valve closely to its seat to prevent leakage and also to insure a steady even movement of the valve in either opening or closing of both valves $d$ and $d'$.

The upper end of the stem D is transversely slotted to receive the cam-shaped end of the actuating-lever E, which is journaled in lugs $b^5$, which project from one side of the upper extension $b^4$. The outer end of the lever E is screw-threaded to receive the arm $e$, by which it is connected to the float E', the weight of which opens the valve when the water in the tank is discharged to flush the bowl and which when the ordinary discharge is closed keeps the valve open until the water rises in the tank, carrying the float up and closing the valve $d$ on its seat, as clearly shown in Fig. 2.

It will be seen that either in the closed or opened position of the valve $d$ no leakage can occur through the top or upper extension of the valve-case and that by reason of the outward pressure of the water between the stem $d^2$ and the cup-shaped valve $d'$ there would be sufficient friction between the edge of the cup-shaped valve and its casing to insure a steady movement and prevent any dancing or jerking movement of the valves in either opening or closing, thus avoiding the splashing and noise incident to valves of this class that are liable to be thrown suddenly from one position to the other. It will also be seen that by bringing the discharge-opening of the valve-case down to near the bottom of the tank or just above the clamping-flange which sustains the valve-case in place a great saving of metal and work is accomplished and the inflow rendered entirely noiseless.

I have shown the controlling-valve $d$ cone-shaped to fit a cone-shaped seat in the partition of the case, and I prefer to make it in this way and incase it in the cup $d^3$, because it can be expanded outwardly to make a close fit with the seat in case of wear by simply tightening up the nut $d^4$ on the lower end of the screw-threaded shank.

What I claim is—

1. In a ball-cock valve the case-body provided with a main-valve seat above the discharge-port and an upper extension to guide the main valve and the piston-valve, said upper extension having an enlarged bore provided with an offset to furnish a seat for a flanged valve around the guide-stem, the valve-stem fitted to slide in the upper bore of the extension and having a flanged valve to seat against the shoulder of the larger extension and provided with a screw-threaded shank to receive the cup-shaped valve at its upper end and the main controlling-valve at its lower end, the actuating-lever to reciprocate the stem to open or close the valves whereby the flanged valve on the lower end of the guide-stem makes a water-tight joint to prevent the water passing through the upper extension when the valve is open, should any leakage occur past the piston-valve.

2. In a ball-cock valve of the character described the combination of the valve-case having an upper extension to guide the valve-stem and an enlarged extension to furnish a seat for an elastic cup-valve and having the offset between the upper and lower bore forming a valve-seat, the valve-stem having its upper end turned to fit the smaller bore of the upper extension to guide the stem truly and having a flanged valve below the guide portion of the stem to close against the seat in said upper extension, a screw-threaded shank below said flanged valve, an elastic cup-valve at the upper end of the screw-threaded shank, a controlling-valve at its lower end and the supplemental shank-screw tapped to hold the elastic valve in place and having a cup-shaped extension at its lower end to hold the elastic controlling-valve, substantially as shown and described.

JOHN PORTEOUS.

Witnesses:
WALTER F. MURRAY,
GEO. J. MURRAY.